US011772006B2

(12) United States Patent
Otani et al.

(10) Patent No.: US 11,772,006 B2
(45) Date of Patent: Oct. 3, 2023

(54) METHOD FOR CLEANING VAPORIZER AND VAPORIZATION APPARATUS

(71) Applicant: FURUKAWA ELECTRIC CO., LTD., Tokyo (JP)

(72) Inventors: Hiroki Otani, Tokyo (JP); Mitsuhiro Kawasaki, Tokyo (JP); Toshiyuki Asai, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/445,973

(22) Filed: Aug. 26, 2021

(65) Prior Publication Data

US 2021/0387106 A1    Dec. 16, 2021

Related U.S. Application Data

(63) Continuation of application No. PCT/JP2020/007978, filed on Feb. 27, 2020.

(30) Foreign Application Priority Data

Mar. 7, 2019    (JP) ................................ 2019-041840

(51) Int. Cl.
   *B01D 1/06*      (2006.01)
   *B01D 1/00*      (2006.01)
   *C03B 37/014*    (2006.01)

(52) U.S. Cl.
   CPC ............. *B01D 1/0064* (2013.01); *B01D 1/06* (2013.01); *B01L 13/00* (2019.08); *C03B 37/01413* (2013.01)

(58) Field of Classification Search
   CPC ......... B01D 1/0064; B01D 1/06; B01L 13/00; C03B 37/01413
   See application file for complete search history.

(56) References Cited

U.S. PATENT DOCUMENTS 5,362,328 A  * 11/1994  Gardiner ............. C23C 16/4483
                                                 134/115 R
5,950,646 A  *  9/1999  Horie ........................ B08B 9/00
                                                 134/102.1
7,487,806 B2 *  2/2009  Letessier ................... B08B 9/00
                                                 141/69

(Continued)

FOREIGN PATENT DOCUMENTS

JP       10-256242 A    9/1998
JP       11-229149 A    8/1999
(Continued)

OTHER PUBLICATIONS

International Search Report dated May 19, 2020 in PCT/JP2020/007978 filed on Feb. 27, 2020, 2 pages.

(Continued)

*Primary Examiner* — Jonathan Miller
(74) *Attorney, Agent, or Firm* — Oblon, McClelland, Maier & Neustadt, L.L.P.

(57) ABSTRACT

A method for cleaning a vaporizer that vaporizes, at normal temperature and pressure, a source material in a liquid state, and supplies the vaporized source material to a reactor through a supply pipe, includes a cleaning step of passing the source material to the vaporizer while maintaining the source material in a liquid state to clean the vaporizer.

8 Claims, 4 Drawing Sheets

(56) References Cited

U.S. PATENT DOCUMENTS

| | | | | |
|---|---|---|---|---|
| 10,758,874 B2* | 9/2020 | Denner | ............... | B01D 3/346 |
| 2012/0276291 A1 | 11/2012 | Bird et al. | | |
| 2017/0037501 A1 | 2/2017 | Oozeki | | |
| 2018/0071694 A1* | 3/2018 | Denner | ............... | B01D 3/346 |

FOREIGN PATENT DOCUMENTS

| | | | |
|---|---|---|---|
| JP | 2005-060118 A | 3/2005 | |
| JP | 2006-223917 A | 8/2006 | |
| JP | 2014-517801 A | 7/2014 | |
| JP | 2017-036172 A | 2/2017 | |
| WO | WO 94/21840 A1 | 9/1994 | |

OTHER PUBLICATIONS

Extended European Search Report dated Oct. 7, 2022 in European Patent Application No. 20766721.3, 7 pages.
Office Action dated May 20, 2023, in Chinese Patent Application No. 202080017984.8 filed Feb. 27, 2020 (with English translation of the cover page and English machine translation of the main body) 18 pages.

* cited by examiner

METHOD FOR CLEANING VAPORIZER AND VAPORIZATION APPARATUS

CROSS-REFERENCE TO RELATED APPLICATION(S)

This application is a continuation of International Application No. PCT/JP2020/007978, filed on Feb. 27, 2020 which claims the benefit of priority of the prior Japanese Patent Application No. 2019-041840, filed on Mar. 7, 2019, the entire contents of which are incorporated herein by reference.

BACKGROUND

The present disclosure relates to a method for cleaning a vaporizer and a vaporization apparatus.

In the related art, a known manufacturing step vaporizes a liquid source material and allows the vaporized source material to undergo a chemical reaction. For example, an optical fiber manufacturing step includes a step of vaporizing a siloxane-based material as a liquid source material of silicon and allowing the vaporized source material to undergo a flame hydrolysis reaction using a burner in a reactor to generate glass microparticles.

For example, in Japanese Laid-open Patent publication No. 2017-36172, a siloxane-based material in a liquid state is used as a source material and introduced into a vaporizer together with a carrier gas to perform vaporization of the source material. Further, Japanese Unexamined Patent Application Publication No. 2014-517801 discloses introducing a siloxane-based material in a liquid state toward a vertical wall of an expansion chamber, the vertical wall being heated, to vaporize the siloxane-based material, using a vaporized portion of the siloxane-based material as a source material, and collecting an unvaporized portion of the siloxane-based material at a lower region of the expansion chamber and flushing the unvaporized portion of the siloxane-based material to a reservoir.

SUMMARY

There is a need for providing a method for cleaning a vaporizer and a vaporization apparatus that are capable of, even if a polymer of a source material is produced, easily removing the polymer.

According to an embodiment, a method for cleaning a vaporizer that vaporizes, at normal temperature and pressure, a source material in a liquid state, and supplies the vaporized source material to a reactor through a supply pipe, includes a cleaning step of passing the source material to the vaporizer while maintaining the source material in a liquid state to clean the vaporizer.

According to an embodiment, a vaporization apparatus incudes: a reservoir configured to store a source material in a liquid state at normal temperature and pressure; a mixer configured to mix the source material in a liquid state and a carrier gas; a vaporizer configured to vaporize the source material in a liquid state supplied from the mixer; a supply pipe through which a mixed fluid of the source material vaporized in the vaporizer and the carrier gas is supplied to outside; and a recirculation structure configured to return the source material in a liquid state from the vaporizer to the reservoir.

DETAILED DESCRIPTION

Figure 1A:
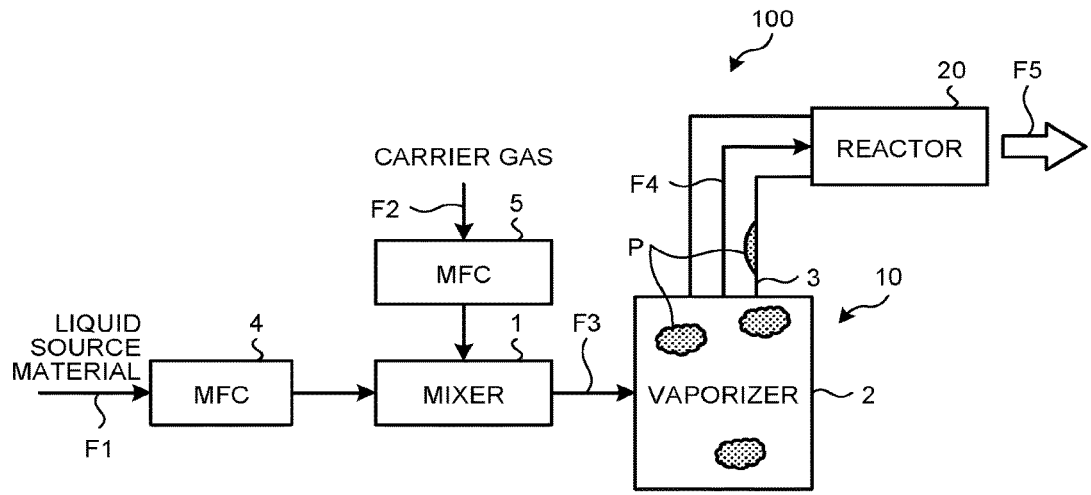
FIG. 1A is an explanatory diagram for explaining a method for cleaning a vaporization apparatus according to a first embodiment.

In the related art, in the method of Japanese Laid-open Patent publication No. 2017-36172, if a path downstream of an exit of the vaporizer cannot be maintained at a predetermined temperature, liquefaction of the siloxane-based material occurs. As a result, the liquefied siloxane-based material may be repeatedly polymerized to produce a polymer, and the produced polymer may be deposited inside the vaporizer. If such deposition progresses, a desired source material flow rate may not be obtained due to an increase in pressure loss inside the vaporizer. Moreover, once a polymer is produced inside the vaporizer, it takes time to remove the polymer. Thus, there is a problem of an increase in the running costs of the vaporizer and a vaporization apparatus provided with the vaporizer. Note that such polymer deposition can also occur in a supply pipe.

On the other hand, in the method of Japanese Unexamined Patent Application Publication No. 2014-517801, although only the vaporized source material can be easily delivered with a polymer excluded, the liquid source material cannot be efficiently vaporized in spite of the large scale of the vaporizer. Thus, there is a problem of an increase in material costs.

Hereinbelow, embodiments of the present disclosure will be described with reference to the drawings. Note that the present disclosure is not limited to the embodiments. Further, identical reference signs appropriately designate identical or corresponding elements throughout the drawings. Furthermore, in the drawings, illustration of a pipe through which fluid is delivered is appropriately omitted.

First Embodiment

Figure 1B:
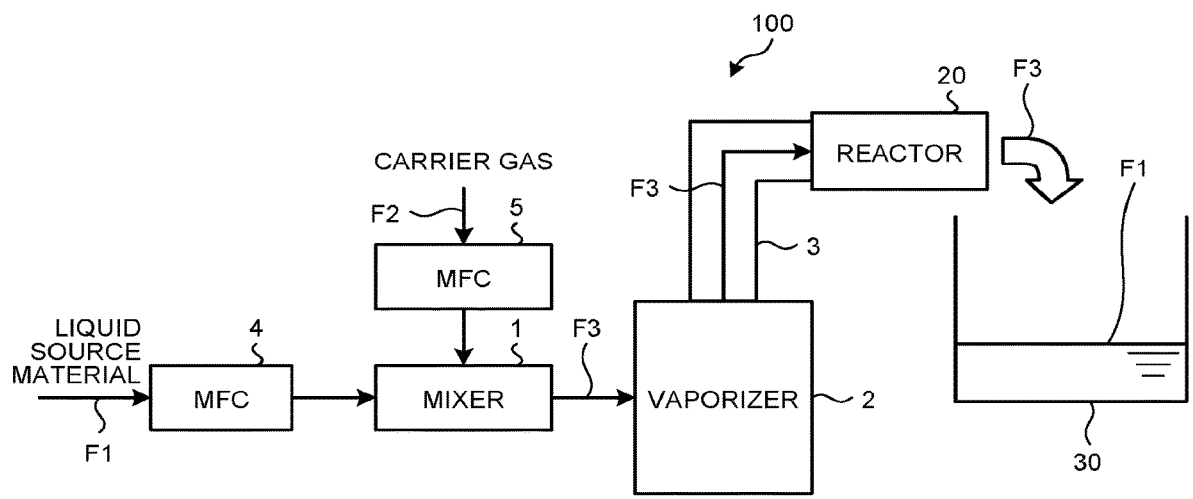
FIG. 1B is an explanatory diagram for explaining the method for cleaning the vaporization apparatus according to the first embodiment.

FIGS. 1A and 1B are explanatory diagrams for explaining a method for cleaning a vaporization apparatus according to a first embodiment. A manufacturing apparatus 100 illustrated in FIG. 1A is an apparatus that manufactures a porous preform used in the manufacture of an optical fiber and includes a vaporization apparatus 10 and a reactor 20.

The vaporization apparatus 10 includes a mixer 1, a vaporizer 2, a supply pipe 3, and mass flow controllers (MFCs) 4 and 5.

The MFCs 4 and 5 are control units for controlling the mass flow rate of fluid. Each of the MFCs 4 and 5 includes a mass flowmeter which measures the mass flow rate, and a solenoid valve whose opening degree is automatically adjusted on the basis of a result of the measurement of the mass flowmeter.

The MFC 4 supplies, to the mixer 1, a source material fluid F1 which is a liquid source material supplied from a supply source while controlling the mass flow rate of the source material fluid F1. The source material fluid F1 is, for example, octamethylcyclotetrasiloxane (OMCTS), which is a siloxane-based material. OMCTS has a melting point of 18° C. and a boiling point of 176° C. at normal pressure and is in a liquid state at normal temperature and pressure. The siloxane-based material is not limited to OMCTS and may be, for example, decamethylcyclopentasiloxane (DMCPS).

The MFC 5 supplies, to the mixer 1, a carrier gas F2 which is a carrier gas supplied from a supply source while controlling the mass flow rate of the carrier gas F2. The carrier gas F2 is, for example, nitrogen gas ($N_2$ gas).

The mixer 1 is, for example, a mixing chamber. The mixer 1 mixes the source material fluid F1 and the carrier gas F2 inside a chamber and supplies the mixture as a mixed fluid F3 to the vaporizer 2.

The vaporizer 2 includes an internal pipe through which the mixed fluid F3 is delivered and a heater which heats the internal pipe, the internal pipe and the heater being built in the vaporizer 2. The vaporizer 2 heats the internal pipe through which the mixed fluid F3 is delivered to vaporize a source material in a liquid state contained in the mixed fluid F3. The vaporizer 2 is configured so as to be capable of maintaining the temperature inside the internal pipe at the boiling point of the source material or higher, for example, at approximately 180° C. in the case of OMCTS to vaporize the source material in a liquid state. The vaporizer 2 delivers a mixed fluid F4 with the source material vaporized to the supply pipe 3.

The mixed fluid F4 is delivered to the reactor 20 disposed outside the vaporization apparatus 10 through the supply pipe 3. The supply pipe 3 is preferably heated by the heater so that the source material contained in the mixed fluid F4 is not liquefied.

The reactor 20 includes a reaction vessel and a burner disposed inside the reaction vessel. For example, a source material other than the OMCTS, diluent gas such as argon, combustion gas which supports combustion, and dopant which is added to soot to be manufactured are also supplied to the reactor 20. The reactor 20 allows the source materials including the OMCTS to undergo a flame hydrolysis reaction using the burner to generate glass microparticles and deposits the generated glass microparticles on a target rod to manufacture the soot. Note that a source material and glass particles that have not been used in the manufacture of the soot are fed to a gas purifier using a suction pump, and the gas purifier removes the source material and the glass particles.

A polymer P of the OMCTS may be deposited in a gel state inside the vaporizer 2 or inside the supply pipe 3. Thus, a cleaning method according to the first embodiment as illustrated in FIG. 1B is executed to remove the polymer P.

First, the mixer 1 performs a mixing step of mixing the source material fluid F1 and the carrier gas F2 to generate the mixed fluid F3 and supplies the mixed fluid F3 to the vaporizer 2.

The vaporizer 2 passes the mixed fluid F3 through the internal pipe while maintaining, in a liquid state, the source material fluid F1 contained in the mixed fluid F3 by retaining the temperature of the mixed fluid F3. Accordingly, a cleaning step is executed. The vaporizer 2 is configured so as to be capable of keeping the temperature inside the pipe at a temperature lower than the boiling point of the source material and higher than the melting point of the source material, for example, at approximately 35° C. in the case of OMCTS to maintain the source material fluid F1 in a liquid state. As a result, the polymer P deposited in the vaporizer 2 is appropriately and easily removed by the source material fluid F1 in a liquid state. The vaporizer 2 delivers the mixed fluid F3 used in the cleaning to the supply pipe 3.

The supply pipe 3 passes therethrough the mixed fluid F3 while maintaining, in a liquid state, the source material fluid F1 contained in the mixed fluid F3 by retaining the temperature of the mixed fluid F3. Accordingly, the cleaning step is further executed. The supply pipe 3 is configured so as to be capable of keeping the temperature inside the pipe at a temperature lower than the boiling point of the source material and higher than the melting point of the source material, for example, at approximately 35° C. in the case of OMCTS to maintain the source material fluid F1 in a liquid state. The mixed fluid F3 used in the cleaning is discharged through the reactor 20, and the source material fluid F1 is stored in a reservoir 30 having a container shape.

According to the cleaning method according to the first embodiment, even if the polymer P is produced, the produced polymer P can be easily removed by passing the mixed fluid F3 of the source material fluid F1 in a liquid state and the carrier gas F2 which is a carrier gas through the vaporizer 2 and the supply pipe 3. Thus, the running costs of the vaporizer 2 and the vaporization apparatus 10 can be reduced.

Second Embodiment

Figure 2:
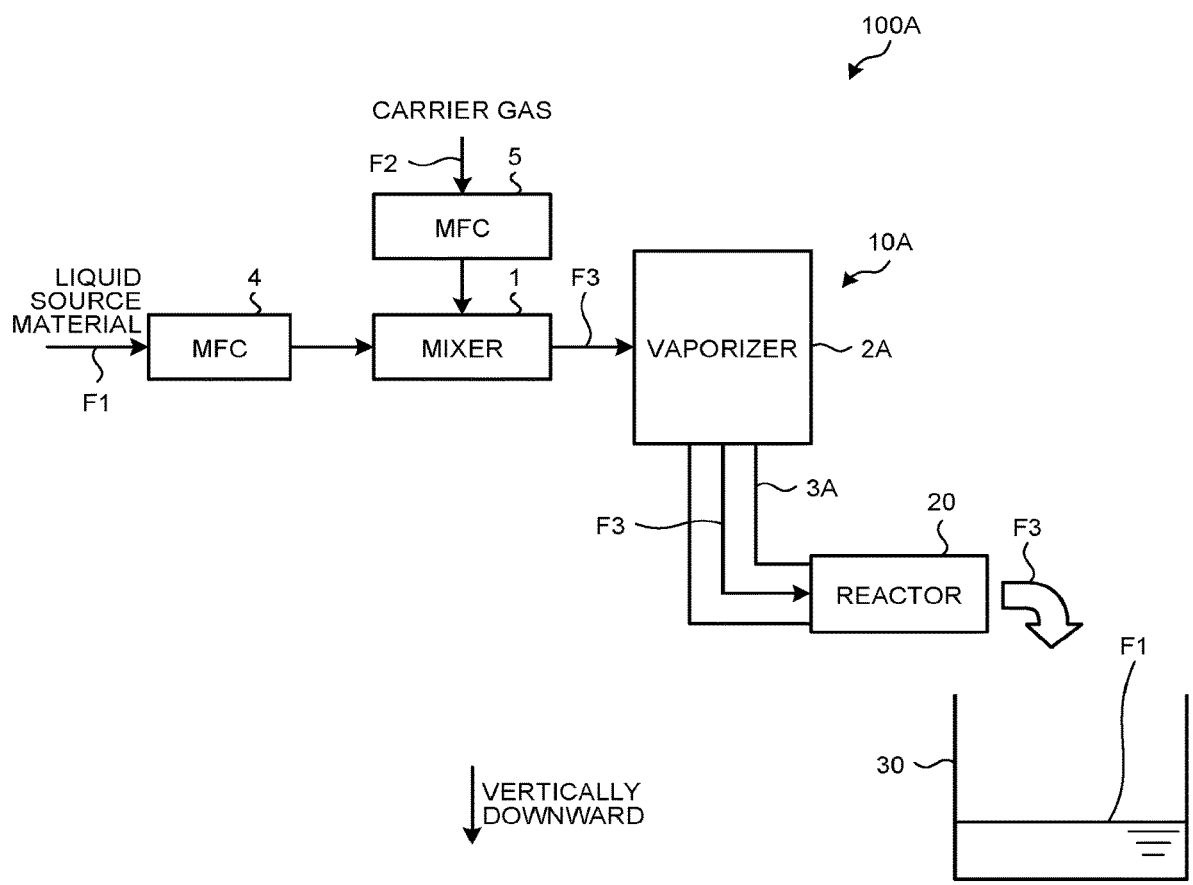
FIG. 2 is an explanatory diagram for explaining a method for cleaning a vaporization apparatus according to a second embodiment.

FIG. 2 is an explanatory diagram for explaining a method for cleaning a vaporization apparatus according to a second embodiment. A manufacturing apparatus 100A illustrated in FIG. 2 has a configuration in which the vaporization apparatus 10 is replaced with a vaporization apparatus 10A in the configuration of the manufacturing apparatus 100 illustrated in FIG. 1.

The vaporization apparatus 10A has a configuration in which the vaporizer 2 and the supply pipe 3 are replaced with a vaporizer 2A and a supply pipe 3A, respectively, in the configuration of the vaporization apparatus 10. The vaporizer 2A differs from the vaporizer 2 in that the vaporizer 2A is connected to the supply pipe 3A on the vertically downward side of the vaporizer 2A. The supply pipe 3A differs from the supply pipe 3 in that the supply pipe 3A is located vertically downward of the vaporizer 2A and connected to the reactor 20.

In performing the cleaning method according to the second embodiment, as with the first embodiment, the mixer 1 performs a mixing step of mixing the source material fluid F1 and the carrier gas F2 to generate the mixed fluid F3 and supplies the mixed fluid F3 to the vaporizer 2.

The vaporizer 2 passes the mixed fluid F3 through the internal pipe while maintaining, in a liquid state, the source material fluid F1 contained in the mixed fluid F3 by retaining the temperature of the mixed fluid F3. Accordingly, as with the first embodiment, a polymer deposited inside the vaporizer 2A is appropriately and easily removed. Further, since the vaporizer 2A is connected to the supply pipe 3A on the vertically downward side of the vaporizer 2A, a polymer having a higher density than the mixed fluid F3 is easily discharged by gravity. The vaporizer 2A delivers the mixed fluid F3 used in the cleaning to the supply pipe 3A.

The supply pipe 3A passes therethrough the mixed fluid F3 while maintaining, in a liquid state, the source material fluid F1 contained in the mixed fluid F3 by retaining the temperature of the mixed fluid F3. Accordingly, as with the first embodiment, a polymer deposited inside the supply pipe 3A is appropriately and easily removed. Further, since the supply pipe 3A extends vertically downward from the vaporizer 2A, the polymer is easily discharged by the gravity. Then, as with the first embodiment, the mixed fluid F3 used in the cleaning is discharged through the reactor 20, and the source material fluid F1 is stored in the reservoir 30 having a container shape.

According to the cleaning method according to the second embodiment, in particular, the discharge of the polymer is facilitated using gravity. Thus, even if a polymer is produced, the produced polymer can be easily removed, and the running costs of the vaporizer 2A and the vaporization apparatus 10A can be reduced.

Third Embodiment

Figure 3:
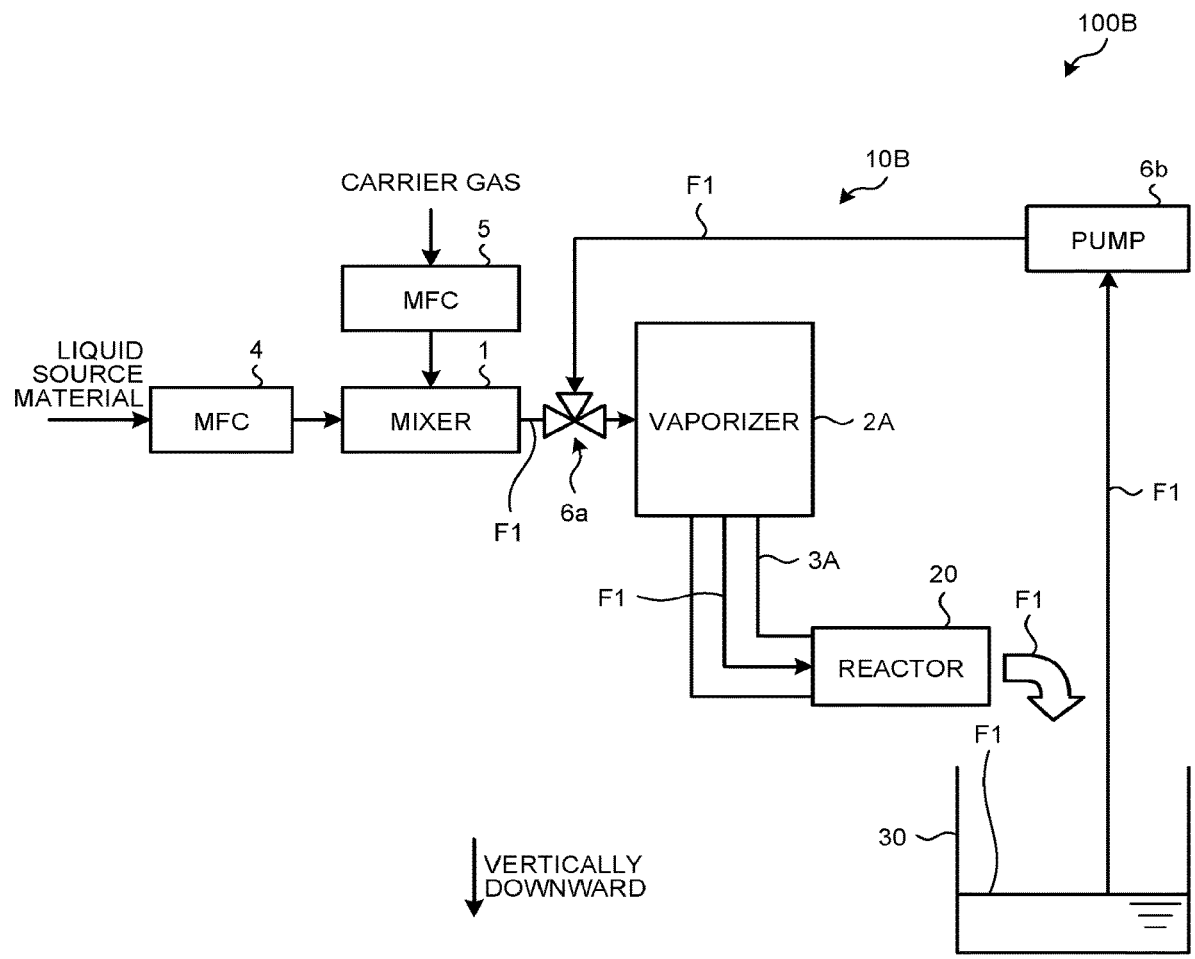
FIG. 3 is an explanatory diagram for explaining a method for cleaning a vaporization apparatus according to a third embodiment.

FIG. 3 is an explanatory diagram for explaining a method for cleaning a vaporization apparatus according to a third embodiment. A manufacturing apparatus 100B illustrated in FIG. 3 has a configuration in which the vaporization apparatus 10A is replaced with a vaporization apparatus 10B in the configuration of the manufacturing apparatus 100A illustrated in FIG. 2.

The vaporization apparatus 10B has a configuration in which a three-way valve 6a and a pump 6b are added to the configuration of the vaporization apparatus 10A.

The three-way valve 6a is disposed between the mixer 1 and the vaporizer 2A. When a manufacturing step using the reactor 20 is performed, the three-way valve 6a functions to pass, to the vaporizer 2A, a mixed fluid of the source material fluid F1 and the carrier gas delivered from the mixer 1.

The pump 6b is configured to draw up the source material fluid F1 in a liquid state stored in the reservoir 30 and pressure-feed the source material fluid F1 to the three-way valve 6a.

When the cleaning method according to the third embodiment is performed, the three-way valve 6a passes the pressure-fed source material fluid F1 to the vaporizer 2A to clean the vaporizer 2A and the supply pipe 3A. At this time, the source material fluid F1 has been pressurized and thus has a high flow velocity. As a result, it is possible to efficiently clean the vaporizer 2A and the supply pipe 3A. Then, as with the first embodiment, the source material fluid F1 used in the cleaning is discharged through the reactor 20 and stored in the reservoir 30. At least part of the source material fluid F1 used in the cleaning may be drawn up by the pump 6b and used in the cleaning of the vaporizer 2A and the supply pipe 3A again.

According to the cleaning method according to the third embodiment, in particular, the discharge of the polymer is facilitated using gravity. Thus, even if a polymer is produced, the produced polymer can be easily removed, and the running costs of the vaporizer 2A and the vaporization apparatus 10B can be reduced. Further, the cleaning efficiency is increased by pressure-feeding the source material fluid F1 using the pump 6b.

Furthermore, since the three-way valve 6a is used in the third embodiment, it is not necessary to rearrange pipes between the manufacturing step and the cleaning step. However, when the cleaning step is performed without using the three-way valve 6a, a pipe from the mixer 1 to the vaporizer 2A may be detached, and a pipe may be directly connected from the pump 6b to the vaporizer 2A to pass the source material fluid F1 through the pipe. In this case, additionally, the supply pipe 3A may be detached from the vaporizer 2A, and the source material fluid F1 may be passed only to the vaporizer 2A to perform cleaning.

Fourth Embodiment

Figure 4:
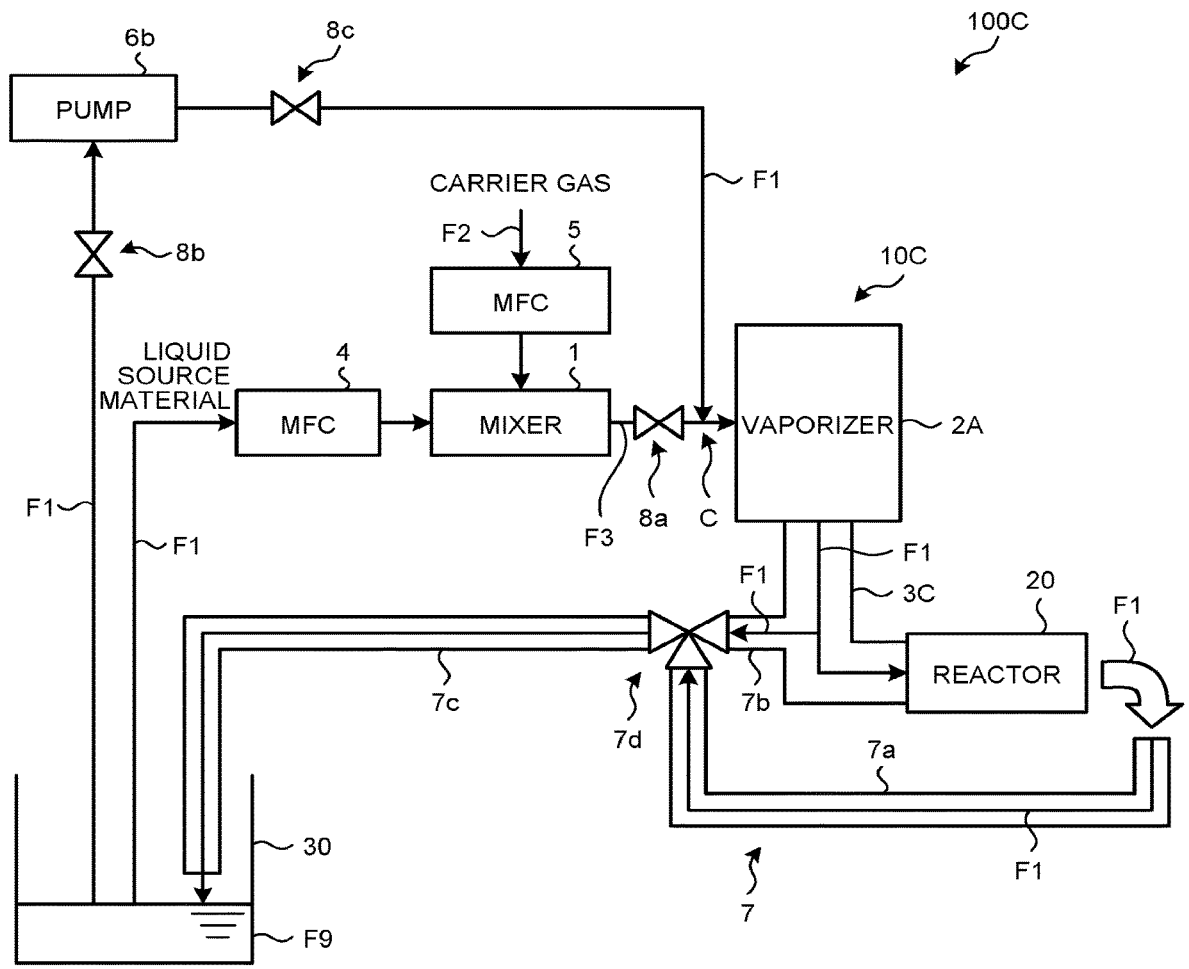
FIG. 4 is an explanatory diagram for explaining a method for cleaning a vaporization apparatus according to a fourth embodiment.

FIG. 4 is an explanatory diagram for explaining a method for cleaning a vaporization apparatus according to a fourth embodiment. A manufacturing apparatus 100C illustrated in FIG. 4 has a configuration in which the vaporization apparatus 10B is replaced with a vaporization apparatus 10C in the configuration of the manufacturing apparatus 100B illustrated in FIG. 3.

The vaporization apparatus 10C has a configuration in which the three-way valve 6a is eliminated, the supply pipe 3 is replaced with a supply pipe 3C, and a recirculation structure 7 and on-off valves 8a, 8b, and 8c are added in the configuration of the vaporization apparatus 10B.

The on-off valve 8a is disposed between the mixer 1 and the vaporizer 2A. When a manufacturing step using the reactor 20 is performed, the on-off valve 8a is kept in an open state to function to pass, to the vaporizer 2A, the mixed fluid F3 of the source material fluid F1 and the carrier gas F2 delivered from the mixer 1.

The pump 6b is configured to draw up the source material fluid F1 in a liquid state stored in the reservoir 30 and pressure-feed the source material fluid F1 to the vaporizer 2A through a confluence C between the on-off valve 8a and the vaporizer 2A. The on-off valve 8b is disposed between the reservoir 30 and the pump 6b. The on-off valve 8c is disposed between the pump 6b and the confluence C.

The recirculation structure 7 includes recirculation pipes 7a, 7b, and 7c and a three-way valve 7d which is connected to the recirculation pipes 7a, 7b, 7c. The recirculation pipe 7b is connected midway of the supply pipe 3C.

When the manufacturing step using the reactor 20 is performed, the on-off valve 8a is kept in an open state, whereas the on-off valves 8b and 8c are kept in a closed state. In this state, the mixed fluid F3 delivered from the mixer 1 is passed to the vaporizer 2A. The vaporizer 2A and the supply pipe 3C pass the mixed fluid F3 to the reactor 20 while maintaining, in a gaseous state, the source material fluid F1 contained in the mixed fluid F3.

On the other hand, when the cleaning method according to the fourth embodiment is performed, the on-off valve 8a is kept in a closed state, whereas the on-off valves 8b and 8c are kept in an open state. The pump 6b draws up the source material fluid F1 stored in the reservoir 30 and pressure-feeds the source material fluid F1 to the vaporizer 2A through the on-off valves 8b and 8c and the confluence C. The pressure-fed source material fluid F1 flows through the vaporizer 2A and the supply pipe 3C. Accordingly, the vaporizer 2A and the supply pipe 3C are efficiently cleaned.

Then, the source material fluid F1 used in the cleaning is discharged through the reactor 20 and stored in the reservoir 30 through the recirculation pipe 7a, the three-way valve 7d, and the recirculation pipe 7c. At least part of the source material fluid F1 used in the cleaning is drawn up by the pump 6b and used in the cleaning of the vaporizer 2A and the supply pipe 3C again.

Further, the three-way valve 7d may be switched to pass the source material fluid F1 from midway of the supply pipe 3C to the reservoir 30 through the recirculation pipe 7b, the three-way valve 7d, and the recirculation pipe 7c. At least part of the source material fluid F1 used in the cleaning is drawn up by the pump 6b and used in the cleaning of the vaporizer 2A and the supply pipe 3C again.

According to the cleaning method according to the fourth embodiment, in particular, the discharge of the polymer is facilitated using gravity. Thus, even if a polymer is produced, the produced polymer can be easily removed, and the running costs of the vaporizer 2A and the vaporization apparatus 10C can be reduced. Further, the cleaning efficiency is increased by pressure-feeding the source material fluid F1 using the pump 6b.

Furthermore, it is not necessary to rearrange pipes between the manufacturing step and the cleaning step in the fourth embodiment. In addition, since the recirculation structure 7 returns the source material fluid F1 from the vaporizer 2A to the reservoir 30, the source material fluid F1 can be efficiently collected.

As Example 1, a manufacturing apparatus having the configuration of the first embodiment was constructed, and OMCTS was used as the source material fluid. The OMCTS maintained at 35° C. was supplied to the vaporizer, and cleaning was performed for several hours. As a result, a polymer in a gel state was discharged from the reactor.

Further, as Example 2, a manufacturing apparatus having the configuration of the second embodiment was constructed, and OMCTS was used as the source material fluid. The OMCTS maintained at 35° C. was supplied to the vaporizer, and cleaning was performed for several hours. As a result, a polymer in a gel state was discharged from the reactor.

Note that the present disclosure is not limited to the embodiments described above. The present disclosure also includes an appropriate combination of the elements described above. Further effects and modifications can be easily derived by those skilled in the art. Thus, broader aspects of the present disclosure are not limited to the embodiments described above, and various changes can be made.

According to an embodiment, even if a polymer of a source material is produced, the polymer can be easily removed. Thus, an effect capable of reducing the running costs of the vaporizer and the vaporization apparatus is achieved.

The present disclosure can be suitably used in the cleaning of a vaporizer and the manufacture of an optical fiber.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A method for cleaning a vaporizer that vaporizes, at normal temperature and pressure, octamethylcyclostetrasiloxane (OMCTS) in a liquid state as a source material, and supplies the vaporized OMCTS to a reactor through a supply pipe, the method comprising
a cleaning step of passing the OMCTS to the vaporizer while maintaining the OMCTS in a liquid state to clean the vaporizer by discharging a polymer of the OMCTS in a gel state, and
a mixing step of mixing the OMCTS with a carrier gas to generate a mixed fluid, wherein
the cleaning step is performed after the mixing step, and
the cleaning step includes passing the mixed fluid to the vaporizer while maintaining, in a liquid state, the OMCTS contained in the mixed fluid to clean the vaporizer by discharging the polymer of the OMCTS in a gel state.

2. The method for cleaning the vaporizer according to claim 1, wherein the cleaning step includes delivering at least part of the OMCTS in a liquid state used in the cleaning to the vaporizer again to clean the vaporizer by discharging the polymer of the OMCTS in a gel state.

3. The method for cleaning the vaporizer according to claim 1, wherein the cleaning step includes passing the OMCTS to the supply pipe while maintaining the OMCTS in a liquid state to clean the supply pipe by discharging the polymer of the OMCTS in a gel state.

4. The method for cleaning the vaporizer according to claim 3, wherein the cleaning step includes passing the OMCTS in a liquid state from the vaporizer to the supply pipe, wherein the supply pipe is located vertically downward of the vaporizer.

5. The method for cleaning the vaporizer according to claim 1, wherein the OMCTS in a liquid state is pressure-fed to the vaporizer using a pump.

6. A vaporization apparatus comprising:
a reservoir configured to store octamethylcyclotetrasiloxane (OMCTS) in a liquid state as a source material at normal temperature and pressure;
a mixing chamber configured to mix the OMCTS in a liquid state and a carrier gas;
a vaporizer configured to vaporize the OMCTS in a liquid state supplied with the carrier gas from the mixing chamber;
a supply pipe through which a mixed fluid of the OMCTS vaporized in the vaporizer and the carrier gas is supplied to a reactor; and
a recirculation pipe configured to return the OMCTS in a liquid state from the vaporizer to the reservoir.

7. The vaporization apparatus according to claim 6, wherein the recirculation structure is located vertically downward of the vaporizer.

8. The vaporization apparatus according to claim 6, further comprising a pump configured to pressure-feed the OMCTS in a liquid state from the reservoir to the vaporizer without passing the OMCTS through the mixing chamber.

* * * * *